3,660,399
QUINOXALINE-DI-N-OXIDE-HYDROXY-LACTONE
AND ITS PRODUCTION

Florin Seng, Cologne, and Kurt Ley, Odenthal-Glorbusch, Germany, assignors to Farbenfabriken Bayer Aktiengesellschaft, Leverkusen, Germany
No Drawing. Filed June 16, 1970, Ser. No. 46,815
Claims priority, application Germany, July 10, 1969,
P 19 34 888.0
Int. Cl. C07d 51/78
U.S. Cl. 260—250 R    9 Claims

---

Quinoxaline-di-N-oxide-hydroxy-lactone is produced by reacting quinoxaline-di-N-oxide of the formula:

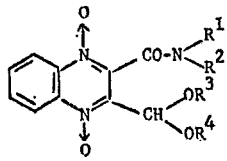

wherein $R^1$ and $R^2$ are the same or different and are lower alkyl, or $R^1$ and $R^2$ are each lower alkyl linnked together with the adjacent nitrogen atom to form a 5- or 6-membered heterocyclic ring, $R^3$ and $R^4$ are the same or different lower alkyl moieties, or $R^3$ and $R^4$ are the same or different lower alkyl moieties linked together with the nitrogen atom to form a 5- or 6-membered heterocyclic ring, in a diluent with at least the theoretically necessary amount of an inorganic or organic acid at a temperature of from about 0° C. to about 50° C. in the presence of at least the stoichiometrically necessary amount of water.

---

The present invention is concerned with quinoxaline-di-N-oxide-hydroxy-lactone and a process for its production. Quinoxaline - di - N - oxide-hydroxy-lactone may be represented by the formula:

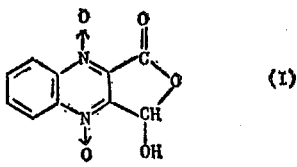

According to the persent invention, quinoxaline-di-N-oxide-hydroxy-lactone is produced by reacting a quinoxaline-di-N-oxide of the formula:

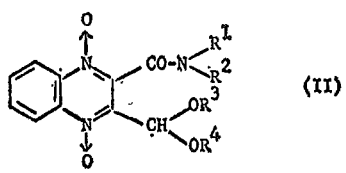

wherein $R^1$ and $R^2$ are the same or different and are lower alkyl, or $R^1$ and $R^2$ are each lower alkyl which are linked together with each other and form together with the nitrogen atom to which they are attached, a 5- or 6-membered heterocyclic ring, $R^3$ and $R^4$ are the same or different lower alkyl moieties, or $R^3$ and $R^4$ are the same or different lower alkyl moieties which are linked to each other and to the oxygen atoms to which they are attached to form a 5- or 6-membered heterocyclic ring, in a diluent with at least the theoretically necessary amount of an inorganic or organic acid at a temperature of from about 0° C. to about 50° C. in the presence of at least the stoichiometrically necessary amount of water.

The lower alkyl moieties of $R^1$, $R^2$, $R^3$ and $R^4$ preferably contain from 1 to 4 carbon atoms.

The quinoxaline-di-N-oxides used as starting materials for the process of the present invention may be obtained in a manner per se known from the appropriate 2-bis-chloromethylquinoxaline-di-N-oxide by reacting it with a suitable sodium alcoholate. Examples of the quinoxaline-di-N-oxide used as starting materials according to the present invention are:

2-bis-methoxy-3-dimethylamino-carbonyl-quinoxaline-di-N-oxide, 2-bis-ethoxy-3-dimethylamino-carbonyl-quinoxaline-di-N-oxide, 2-bis-methoxy-3-di-ethylamino-carbonyl-quinoxaline-di-N-oxide, 2-bis-ethoxy-3-di-ethylamino-carbonyl-quinoxaline-di-N-oxide, 2-bis-methoxy-3-dipropylamino-carbonyl-quinoxaline-di-N-oxide, 2-bis-methoxy-3-pyrrolidino-carbonyl-quinoxaline-di-N-oxide, and 2-bis-methoxy-3-piperidino-carbonyl-quinoxaline-di-N-oxide.

The inorganic or organic acids used in the process of the present invention preferably have a dissociation constant which lies in the range of from about $10^9$ to about $10^{-5}$. Examples of organic acids include benzenesulphonic acid, toluenesulphonic acid and alkylsulphonic acids with up to 6 carbon atoms in the alkyl moiety. It is preferred to use an aqueous inorganic acid and the preferred aqueous inorganic acids include the halogen hydracids, sulphuric acid or nitric acid. Among the halogen hydracids, hydrochloric acid is particularly preferred and may be used either in the form of an aqueous solution or as a gas.

Diluents according to the process of the present invention include water and organic solvents, such as tetrahydrofuran, dioxane, acetic acid, or mixtures thereof.

At least 1 mole of acid and at least 2 moles of water (in the case of organic acids or concentrated inorganic acids) are used per mole of 2-bis-dialkoxymethyl-3-carbonamido-quinoxaline-di-N-oxide.

The reaction is generally carried out as follows:

1 mole of the quinoxaline-di-N-oxide of the Formula II is dissolved or suspended in the diluent, 1 to 2 moles of acid and, optionally, 2 moles of water, are added and the mixture is stirred at about 0 to about 50° C., preferably to about 20 to 30° C. After a short time, the lactone according to the invention generally separates in crystalline form.

If, for example 2 - dimethoxymethyl-3-dimethylamino-carbonyl-quinoxaline-di-N-oxide is used as starting material, and hydrochloric acid is used as the acid, the reaction course can be represented by the following formula scheme:

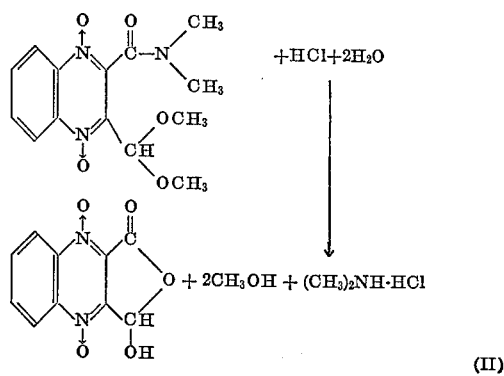

(II)

The quinoxaline-di - N - oxide-hydroxy-lactone of the present invention is a useful and valuable intermediate for the production of pharmaceutically active compounds, particularly anti-bacterial agents and itself also exhibits anti-bacterial activity as can be seen from the table folowing. It is also useful as an intermediate for the production of crop protective agents.

Quinoxaline-di-N-oxide-hydroxy-lactone of the present invention, however, is particularly useful for the production of quinoxaline-di-N-oxide aldehyde according to the process of co-pending United States application Ser. No. 46,814 filed June 16, 1970.

The following non-limitative example more particularly illustrates the present invention:

EXAMPLE 30.7 g. (0.1 mole) of 2-bis-methoxymethyl-3-dimethyl-aminocarbonylquinoxaline-di-N-oxide(1,4) are introduced at about ambient temperature into 100 ml. of a 10%-strength aqueous hydrochloric acid. A clear solution forms and, after a short time, the compound according to the invention separates in the form of a yellow precipitate which, after 6 hours, is filtered off with suction. There are thus obtained 17 g. (72.6% of the theory) of 1-oxo-3-hydroxy - 1,3-dihydrofuro (3,4-b)quinoxaline-4,9-dioxide in the form of yellow crystals.

For purification, the compound is dissolved in sodium bicarbonate solution, filtration is effected and the filtrate is acidified. The purified compound melts at 156–159° C., with frothing up.

$C_{10}H_6N_2O_5$ (235)—Calc. (percent): C, 51.3; H, 2.6; N, 12.0. Found (percent): C, 52.0; H, 2.8; N, 12.6.

The good anti-bacterial effectiveness which the use of the present compound renders possible in human and veterinary medicine can be seen from the following table:

TABLE

Minimum inhibition concentration (M.I.C. in the Agar plate test; Incubation temperature: 37° C., determination time: 24 and 58 hours.

| Bacterium | M.I.C. γ/ml. |
| --- | --- |
| Klebsiella pneumonia 8085 | 150 |
| Streptococcus pyogenes W | 100 |
| *Escherichia coli* B | 150 |

The nutrient medium used contained the following ingredients per litre:

| | G. |
| --- | --- |
| Proteose-peptone | 10.0 |
| Veal extract (dry substance) | 10.0 |
| Dextrose | 2.0 |
| Sodium chloride | 3.0 |
| Disodium phosphate | 2.0 |
| Sodium acetate | 1.0 |
| Adenine-sulphate | 0.01 |
| Guanine-hydrochloride | 0.01 |
| Uracil | 0.01 |
| Xanthine | 0.01 |
| Neutral agar | 12.0 |

The invention, therefore, also provides an anti-bacterial composition comprising as active ingredient the compound of the invention in admixture with a solid or liquid pharmaceutically acceptable non-toxic diluent or carrier. Any of the conventional diluents and cariers in the pharmaceutical field may of course be used.

What is claimed is:

1. Quinoxaline - di - N - oxide-hydroxy-lactone of the formula:

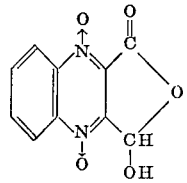

2. A process for the production of a compound of claim 1 which comprises reacting a quinoxaline-di-N-oxide of the formula:

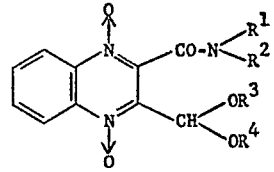

wherein:
$R^1$ and $R^2$ are the same or different and are lower alkyl, or $R^1$ and $R^2$ are each lower alkyl linked together with the nitrogen atom to which they are attached to from a 5- or 6-membered heterocyclic ring,
$R^3$ and $R^4$ are the same or different lower alkyl moieties, or $R^3$ and $R^4$ are the same or different lower alkyl moieties linked together with the oxygen atoms to which they are attached to form a 5- or 6-membered heterocyclic ring, in a diluent with at least the theoretically necessary amount of acid having a dissociation constant of about $10^9$ to $10^{-5}$ at a temperature of from about 0° C. to about 50° C. in the presence of at least the stoichiometrically necessary amount of water.

3. A process according to claim 2 which comprises recovering the quinoxaline - di - N-oxide-hydroxy-lactone produced.

4. A process according to claim 2 wherein the lower alkyl moieties have 1 to 4 carbon atoms.

5. A process according to claim 2 wherein the acid is benzenesulphonic acid, toluenesulphonic acid or alkyl-sulphonic acid of up to 6 carbon atoms in the alkyl moiety, or halogen hydracid, sulphuric acid or nitric acid.

6. A process according to claim 2 wherein the diluent is water, tetrahydrofuran, dioxane, acetic acid or a mixture thereof.

7. A process according to claim 2 which comprises reacting 1 to 2 moles of acid and 2 moles of water per mole of quinoxaline-di-N-oxide.

8. A process according to claim 7 wherein the reaction temperature is from about 20° C. to about 30° C.

9. A process for the production of 1-oxo-3-hydroxy-1,3-dihydrofuro (3,4-b)quinoxaline-4,9-dioxide which comprises reacting 2 - bis-methoxymethyl-3-dimethylamino-carbonylquinoxaline-di-N-oxide(1,4) with aqueous hydrochloric acid at a temperature of from about 0° C. to about 50° C.

References Cited

UNITED STATES PATENTS

| 3,557,109 | 1/1971 | Ley et al. | 260—250 R |
| 3,558,624 | 1/1971 | Ley et al. | 260—250 R |

NICHOLAS S. RIZZO, Primary Examiner

U.S. Cl. X.R.

424—250